June 22, 1965   M. S. BRADWAY   3,190,329
ARTICLE SCOURING CONVEYOR
Filed July 22, 1963

INVENTOR.
BY Malcolm S. Bradway

United States Patent Office 3,190,329
Patented June 22, 1965

3,190,329
ARTICLE SCOURING CONVEYOR
Malcolm S. Bradway, 621 W. Maple St., Hinsdale, Ill.
Filed July 22, 1963, Ser. No. 296,762
6 Claims. (Cl. 146—49)

The present invention is directed to new and useful improvements in methods and apparatus for cleaning surfaces of articles, which articles may be either regularly shaped as in the case of sphere ball bearings, or irregularly shaped as are typified by vegetables such as beets, potatoes, onions or the like.

The major purposes of the present invention are to create a combined cleaning and conveying structure for cleaning surfaces of articles, the system being so arranged as to easily accommodate and readily clean articles of widely varied shapes and contours while at the same time permitting a variance in the cleaning and/or scouring action imparted to the articles and being readily adaptable for incorporation as a conveying system in a production line, these and other purposes of the invention being more apparent in the ensuing specification and claims, when taken with the accompanying drawings, in which:

Like elements are designated by like characters throughout the specification and drawings.

Figure 1:
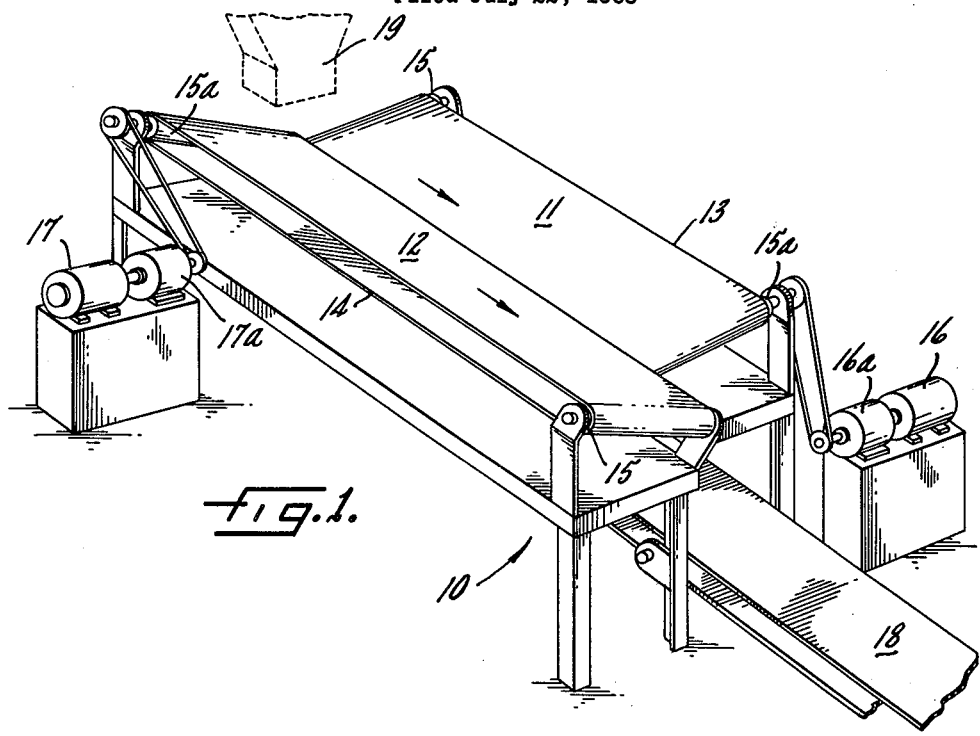
FIGURE 1 is a perspective view, in more or less diagrammatic form, of the improved conveyor structure incorporating the principles of the present invention.

With particular reference now to the drawings and in the first instance to FIGURE 1, the numeral 10 designates a suitable supporting framework for movable conveying surfaces 11 and 12. Conveying surfaces 11 and 12 conveniently take the form of the upper surfaces provided by endless conveying belts 13 and 14. The conveying belts 13 and 14 are supported for movement on supporting and drive rollers 15 and 15a journalled in suitable bearings 15b at the opposite ends of the belt. The supporting and drive rollers for the endless belts may take any one of several known forms.

As is particularly seen in the drawings, the conveying surfaces are arranged in a more or less V-shaped disposition with the lower surfaces thereof spaced a small distance from one another so as to provide a discharge space between the lower portions of the two conveying surfaces, to thereby support articles, such as irregularly shaped vegetables or the like in the troughlike structure created by the two conveying surfaces. The discharge slot should be of relatively narrow width with relation to the dimensions of the articles being cleaned so as to prevent wedging of articles in the slot or discharge of articles through the slot.

Figures 2, 3:
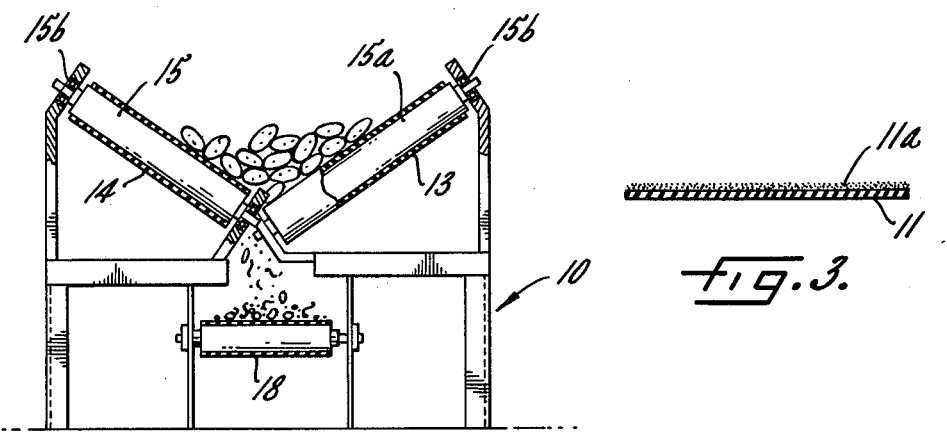
FIGURE 2 is an end view of the conveyor structure illustrated in FIGURE 1.
FIGURE 3 is a sectional view of one conveying surface with abrasive material thereon.

In accordance with the principles of the invention, the conveying surfaces are provided with scouring or cleaning facilities thereon so as to impart a scrubbing, scouring, or cleaning action to articles supported on the conveying surfaces. The endless belts, may, for example, be provided with abrasive material 11a (FIGURE 3) imbedded in and on the surface layers thereof so as to essentially "grind" the surfaces of the articles being cleaned. For a lesser degree of scouring action, the surfaces of the conveyors may be provided with brushlike bristles or the like so as to essentially clean the surfaces of articles of dirt or foreign matter while leaving the natural surface essentially intact.

Means are provided for driving the two conveying surfaces at different speeds relative to one another along essentially parallel paths. This means, as is diagrammatically illustrated in the drawings, may take the form of motors 16 and 17 for driving the drive rollers of the two conveying belts 13 and 14, respectively. Suitable means such as belts and pulleys may be utilized as a transmission between the motors and the drive rollers of the conveyors. Means are also provided for varying the speed of each conveying belt individually so as to control the relative movement between the two conveying surfaces. This means may take the form of variable speed and reversible drive motors or a suitable change speed and variable speed transmission 16a and 17a between the drive motors and drive rollers. Variable speed and reversible pulley arrangements or variable speed and reversible gear transmissions may be used in lieu of variable speed and reversible motors. Since such variable speed mechanisms are well known to the art, and since the details of variable speed mechanisms as such form no part of the present invention, they are not illustrated in detail in the drawings.

A spoils conveyor 18 may be positioned beneath the discharge slot between the two conveyors so as to carry away and dispose of material removed from the articles during the scouring process.

Suitable hopper means as indicated in dotted lines at 19 in FIGURE 1 may be utilized, if desired, to deposit articles to be scoured on one end of the two conveyors, while suitable discharge chutes or the like may be provided at the other end of the two conveyors, the arrangement being such that articles fed by the hopper to the conveyors are eventually conveyed by the conveyors to the discharge chute.

One conveyor, as for example conveyor 14 may be longer than the other so as to facilitate close positioning of the lower edges of the belts while avoiding interference between the rollers and bearing structures for the opposite ends of the belts.

In operation, one conveyor, as for example, the conveyor 13 is driven at a different speed from the other. This difference in relative speed causes a tumbling action of articles deposited at the inlet ends of the conveyors. By reason of this tumbling action and by reason of slippage of the articles on the two conveyors, as induced by the relative movement between the two conveyors, the surfaces of the articles will be scoured and cleaned. In this regard, the material feed rate to the conveyors should preferably be such that most of the articles supported on the conveying structure are in contact with each of the conveying surfaces at the same time and thus impart the tumbling and slippage action as aforesaid. The relative speeds utilized with the invention may vary with the type of articles being scoured, and the length of scouring time desired for each clash of articles. For example, for a relatively light scrubbing or scouring action, both conveyors may be moved in a direction towards the discharge ends thereof while one conveyor moves at a speed greater than that of the other so that articles received at the inlet side are tumbled and cleaned as they move to the discharge end of the conveyors. For a greater scouring action, one conveyor may be maintained essentially stationary or even driven in an opposite direction from the other conveyor but at a slower speed so that the resultant movement imparted to the articles is toward the discharge end of the conveyors. For an intense scouring action, the two conveyors may be driven in opposite directions but at the same speed so as to hold articles supported thereon essentially stationary with respect to the opposite ends of the conveyors while the articles themselves undergo the tumbling action aforementioned. After a predetermined period of scouring time, the speed of one conveyor may be then adjusted so as to result in a resultant velocity of the two conveyors, such as to move the articles thereon to the discharge ends of the conveyors. With this method of operation, an operator can cause deposit of a predetermined number of articles on the conveyors and then operate the speeds of the conveyor such as to hold the articles at one location thereon while causing the desired degree of tumbling and scouring action. After a desired degree of scouring time has been reached, as determined by visual inspection of the articles, the operataor can then change the speed and/or directions of movement of the conveyors so as to create a resultant velocity such that the articles are moved to the discharge ends of the conveyors.

While the conveyor belts may have a V-shaped angular disposition which is constant from the inlet ends thereof to the outlet, the angle included between the two belts may be varied from one end to the other through use of supporting rollers positioned intermediate the ends of the belts and at different inclinations to one another, thereby creating scouring surfaces that are positioned at varying inclinations to one another and thus improve the scouring action imparted to various portions of the articles supported the conveyors.

Whereas I have shown and described an operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claims.

I claim:
1. A system for scouring surfaces of regular and irregular shaped articles including a plurality of conveying belts having substantially identical conveying and supporting surfaces extending alongside one another, for movement along parallel paths, said surfaces having means thereon to impart a scouring action to objects placed upon said surfaces, said surfaces being disposed at angles to one another in upwardly divergent fashion so as to form a troughlike structure for supporting articles to be scoured therein, and means for moving said surfaces at different speeds with relation to one another such as to cause tumbling and slippage of objects on said surfaces while being conveyed and supported by said belts.

2. The structure or claim 1 wherein said conveying belts are positioned with the ends of adjacent belts spaced longitudinally from each other.

3. The structure of claim 1 wherein said surfaces have a discharge slot defined therebetween and a spoils conveyor is positioned beneath said slot.

4. The structure of claim 1 wherein said moving means moves said conveying members in the same direction but at different speeds.

5. The structure of claim 1 characterized by and including variable speed drive means for moving said belts at different speeds.

6. The structure of claim 1 characterized by and including variable speed drive means for moving said belts and including means for moving said belts in opposite directions.

References Cited by the Examiner
UNITED STATES PATENTS

| | | | |
|---|---|---|---|
| 59,324 | 10/66 | Wathew. | |
| 755,937 | 3/04 | Richardson et al. | 15—3.11 |
| 1,058,460 | 4/13 | Porter | 15—3.21 |
| 1,325,847 | 12/19 | Horst | 146—226 |
| 1,438,467 | 12/22 | Walden | 146—226 |
| 1,457,861 | 6/23 | Stebler | 15—3.21 |
| 2,178,007 | 10/39 | Thompson | 146—49 |
| 2,180,559 | 11/39 | Stebler | 209—102 |
| 2,316,368 | 4/43 | Sells | 146—49 |
| 2,579,604 | 12/51 | Niederer et al. | 51—138 |
| 3,002,219 | 10/61 | Bried | 17—11.1 |

References Cited by the Applicant
UNITED STATES PATENTS

| | | |
|---|---|---|
| 534,783 | 2/95 | Cerruti. |
| 859,933 | 7/07 | Evan. |
| 1,204,685 | 11/16 | Phillips. |
| 1,292,820 | 1/19 | Lindsey. |
| 1,427,264 | 8/22 | Clear. |
| 1,668,448 | 5/28 | Balcom. |
| 2,547,473 | 4/51 | Klem. |
| 2,591,194 | 4/52 | Pfister. |
| 2,620,064 | 12/52 | Thys. |
| 3,098,324 | 7/63 | Straub. |

J. SPENCER OVERHOLSER, *Primary Examiner.*